(12) United States Patent
Velasco

(10) Patent No.: US 8,908,048 B2
(45) Date of Patent: Dec. 9, 2014

(54) DIGITAL VIDEO PIXEL TESTER

(75) Inventor: Adolfo Velasco, Saddle Brook, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 706 days.

(21) Appl. No.: 12/862,320

(22) Filed: Aug. 24, 2010

(65) Prior Publication Data

US 2012/0050541 A1   Mar. 1, 2012

(51) Int. Cl.
*H04N 17/00* (2006.01)
*H04N 17/02* (2006.01)
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl.
CPC ..................................... *H04N 17/02* (2013.01)
USPC ....... 348/181; 348/180; 382/233; 375/240.33

(58) Field of Classification Search
None
See application file for complete search history.

(56) References Cited

U.S. PATENT DOCUMENTS

| 5,122,873 | A | * | 6/1992 | Golin | 375/240.23 |
| 6,741,277 | B1 | * | 5/2004 | Rau | 348/181 |
| 7,391,434 | B2 | | 6/2008 | Yang | |
| 7,394,940 | B2 | | 7/2008 | Kahan | |
| 7,522,776 | B2 | * | 4/2009 | Kahan | 382/233 |
| 7,710,454 | B2 | * | 5/2010 | Yang | 348/180 |

* cited by examiner

*Primary Examiner* — Jefferey Harold
*Assistant Examiner* — Sean Haiem
(74) *Attorney, Agent, or Firm* — Crestron Electronics, Inc.

(57) ABSTRACT

Presented is a system and method for testing a digital video distribution environment. A digital video signal generator transmits a reference video bit stream to a distribution path. A digital video signal analyzer receives a test video bit stream from the distribution path. The digital video signal analyzer generates a diagnostic video bit stream as a function of the reference video bit stream and the test video bit stream.

16 Claims, 9 Drawing Sheets

| R: 240 | R: 240 | R: 240 |
|---|---|---|
| G: 100 | G: 100 | G: 100 |
| B: 200 | B: 200 | B: 200 |

22⌇          221

| R: 255 | R: 200 | R: 240 |
|---|---|---|
| G: 255 | G: 150 | G: 100 |
| B: 255 | B: 250 | B: 200 |

23⌇          231

| R: 15 | R: 40 | R: 0 |
|---|---|---|
| G: 155 | G: 50 | G: 0 |
| B: 55 | B: 50 | B: 0 |

| R: 240 | R: 240 | R: 240 |
| G: 100 | G: 100 | G: 100 |
| B: 200 | B: 200 | B: 200 |

313⌐ 　　　　　　　　　514　　　　513

| R: 255 | R: 200 | R: 240 |
| G: 255 | G: 150 | G: 100 |
| B: 255 | B: 250 | B: 200 |

315⌐ 　　　　　　　　　516　　　　515

| R: 15  | R: 40  | R: 0 |
| G: 155 | G: 50  | G: 0 |
| B: 55  | B: 50  | B: 0 |

US 8,908,048 B2

DIGITAL VIDEO PIXEL TESTER

BACKGROUND OF THE INVENTION

1. Technical Field

The present invention generally relates to digital video distribution and more particularly to testing digital video distribution environments for pixel errors.

2. Background Art

A digital video distribution environment is a common installation in residences and commercial buildings. Increasingly, more sophisticated and expansive digital video distribution environments are employed to distribute digital video. There is now a demand for an improved system and method for testing such digital video distribution environments.

Prior art FIG. 1 is a block diagram of an illustrative digital video distribution environment 10. The digital video distribution environment 10 links four (4) digital video sources 11A-D, such as a Blu-ray player, with eight (8) digital video sinks 15A-H, such as a television. Between the four digital video sources 11A-D and eight digital video sinks 15A-H are processing components, such as encoders and decoders. Each path from a source to a sink including all intermediary processing components is a distribution path 16. For example, the distribution path 16 between the first digital video source 11A and the first digital video sink 15A includes the first processing component 12 and the second processing component 13.

Digital video streams comprise a plurality of pixels organized into a plurality of frames. The number of pixels per frame corresponds to the resolution of the digital video. For example, one frame of video at a resolution of 1080p (i.e. 1920 horizontal pixels×1080 vertical pixels), a common resolution, comprises 2,073,600 pixels. At a frame rate of 60 frames per second (fps), ten seconds of digital video at a resolution of 1080p comprises 1,244,160,000 pixels.

Each pixel further comprises color coordinates, which define the color of the pixel. For example, in the red green blue (RGB) color coordinate system, each pixel comprises a red color coordinate, a green color coordinate and a blue color coordinate. A full red pixel in the RGB color coordinate system with 8 bit color depth comprises a red color coordinate of 255, a green color coordinate of zero, and a blue color coordinate of zero.

As the complexity of digital video distribution environments 10 increases, video issues become increasingly more difficult to diagnose and correct. Various factors including intermediary processing and interference may cause visible errors in the displayed video. These visible errors can adversely affect a user's viewing experience and must be diagnosed and corrected. One malfunctioning component of a digital video distribution environment 10 can cause video issues with the entire digital video distribution environment 10, potentially causing consumer dissatisfaction with the other fully functional components.

More specifically, pixel errors are known to those skilled in the art as a factor related to less than optimal viewing experience. A pixel error is a pixel that has one or more color coordinates altered during transmission from the digital video source 11A-D to the digital video sink 15A-H, resulting in discolored pixels displayed by the digital video sink. Pixel errors commonly occur when distributing compressed or encoded digital video or digital video processed with other lossy methods.

Methods and systems for testing a digital video distribution environment 10 are known in the prior art. However, due to the precise nature of digital video there is currently a trend toward automated diagnosis of video issues. Increasingly, diagnostic data is processed to achieve an objective score or result, taking human analysis and subjective criteria out of the equation. In instances where an objective score is not computed, the diagnostic results are often provided as a set of data values. This is undesirable, as the methodology for objective scores can be opaque and diagnostic data can be difficult to interpret or understand.

Visually displaying pixel errors provides a technician with a diagnostic tool for use in the field. The technician may make quick diagnoses of display issues by recognizing common patterns of pixel errors. Additionally, with a visual display of pixel errors, the installer may more intuitively relate the diagnoses to untrained clients. Methods and systems for visually diagnosing pixel errors are known in the prior art. More specifically, methods and systems are known for generating a differential video including pixels computed from the mathematical differences between a reference video bit stream before and after processing. Accordingly, pixel errors in the differential video are displayed according to their magnitude and at their native resolution.

Refer to prior art FIG. 2. As an example of the above prior art method assume a pixel 211 of the reference video bit stream 21 has a red color coordinate of two hundred forty (240), a green color coordinate of one hundred (100) and a blue color coordinate of one hundred (100) before processing. Next, assume that after passing through the distribution path 16, the pixel 221 has a red color coordinate of two hundred (200), a green color coordinate of one hundred fifty (150), and a blue color coordinate of one hundred fifty (150) after processing. According to known methods, a differential pixel is displayed having color coordinates that are the differences between the pixel color values before and after processing. Accordingly, a differential video would be displayed having a corresponding pixel with red, green and blue coordinates of fifty (50), forty (40), and forty (40), respectively.

Those skilled in the art will recognize that this method is suitable for locating pixel errors of a large magnitude or large contiguous clusters of pixel errors. However, pixels errors of a small magnitude may be visually indistinguishable from pixels without errors. Similarly, individual pixels or small clusters of pixels are difficult to detect. Consequently, there is a need for a system and method of testing digital video to emphasize the location of pixel errors.

SUMMARY OF THE INVENTION

It is to be understood that both the general and detailed descriptions that follow are exemplary and explanatory only and are not restrictive of the invention.

DISCLOSURE OF INVENTION

Accordingly, a need exists for an improved system and method of testing a distribution path of a digital video distribution environment for pixel errors. The embodiments of the present invention provide these advantages and others not specifically mentioned above but described in the sections to follow.

According to a first aspect, the present invention provides a method for testing a distribution path of a digital video distribution environment. The method comprises the steps of: transmitting a reference video bit stream comprising N reference pixels from a digital video signal generator to the distribution path; receiving a test video bit stream comprising N test pixels, from the distribution path at a digital video signal analyzer; and generating a diagnostic video bit stream comprising N diagnostic pixels, each of the N diagnostic pixels corresponding to one of the N reference pixels and one of the N test pixels, by assigning a first color to each diagnostic pixel whose corresponding test pixel and reference pixel match and assigning a second color to each diagnostic pixel whose corresponding reference pixel and test pixel do not match.

According to a second aspect, the present invention provides a system for testing a distribution path of a digital video distribution environment. The system comprises a digital video signal generator and a digital video signal analyzer. The digital signal generator is for transmitting a reference video bit stream comprising N reference pixels to the distribution path. The digital video signal analyzer is for receiving a test video bit stream comprising N test pixels from the distribution path and generating a diagnostic video bit stream comprising N diagnostic pixels, each of the N diagnostic pixels corresponding to one of the N test pixels and one of the N reference pixels. The digital video signal analyzer generates the diagnostic video bit stream by assigning a first color to diagnostic pixels whose corresponding test pixel and reference pixel match and assigning a second color to diagnostic pixels whose corresponding test pixel and reference pixel do not match.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
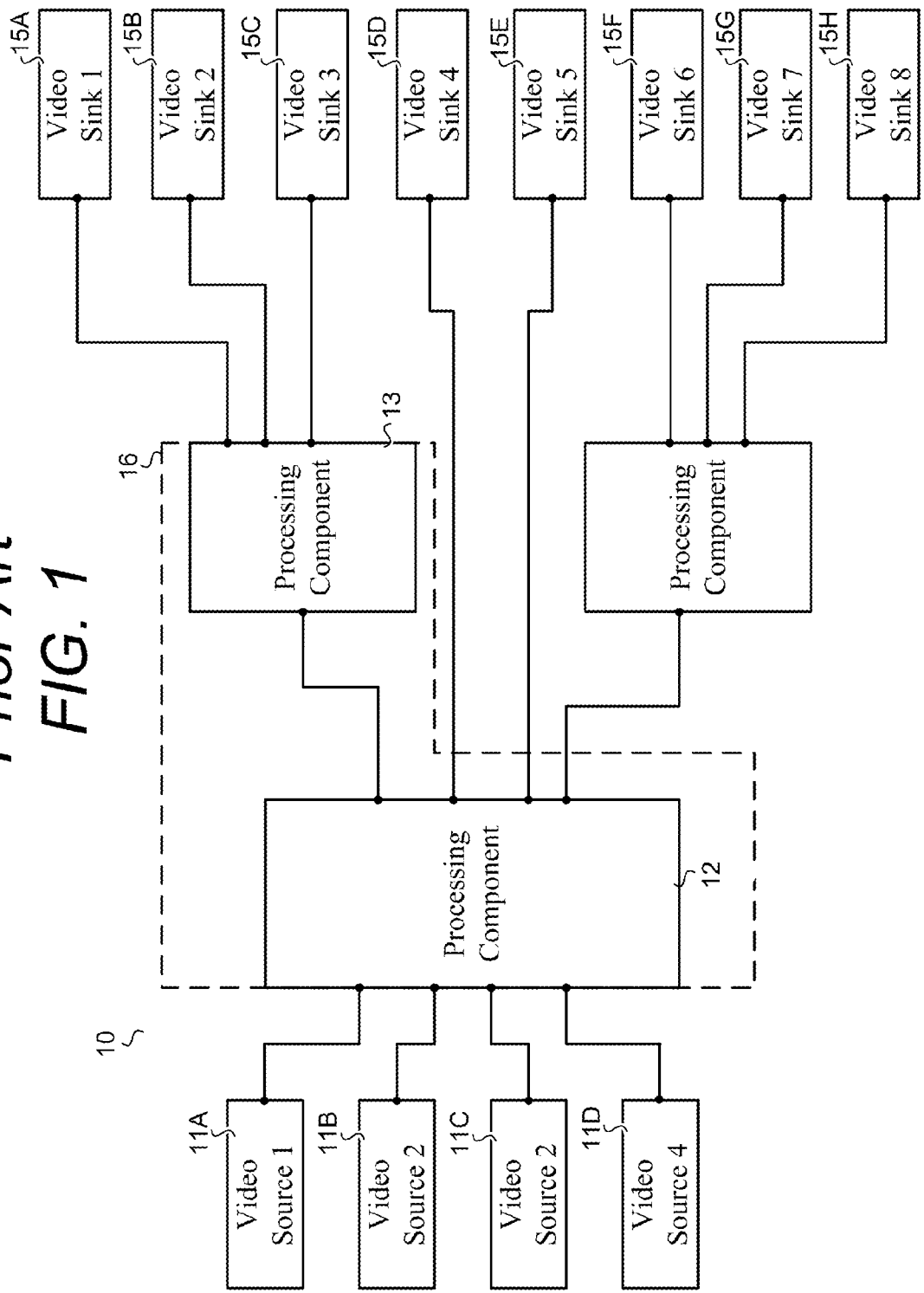

Prior art FIG. 1 is a block diagram of an illustrative digital video distribution environment for distributing digital video.

Prior art FIG. 2 is a block diagram illustrating a prior art method for testing a distribution path of a digital video distribution environment.

Figure 3:
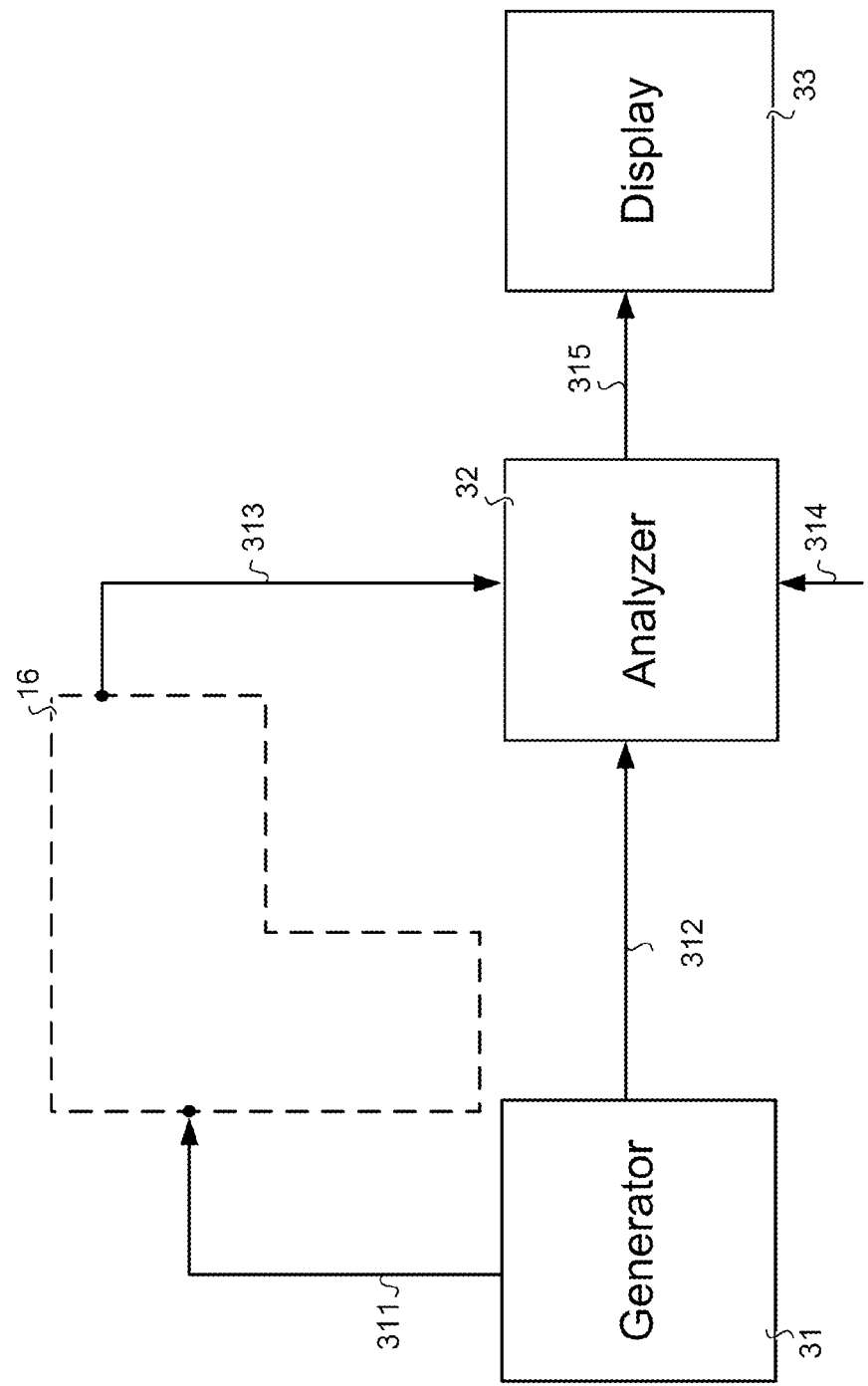

FIG. 3 is an illustrative block diagram of a system for testing a distribution path of a digital video distribution environment, according to an embodiment of the invention.

Figure 4:
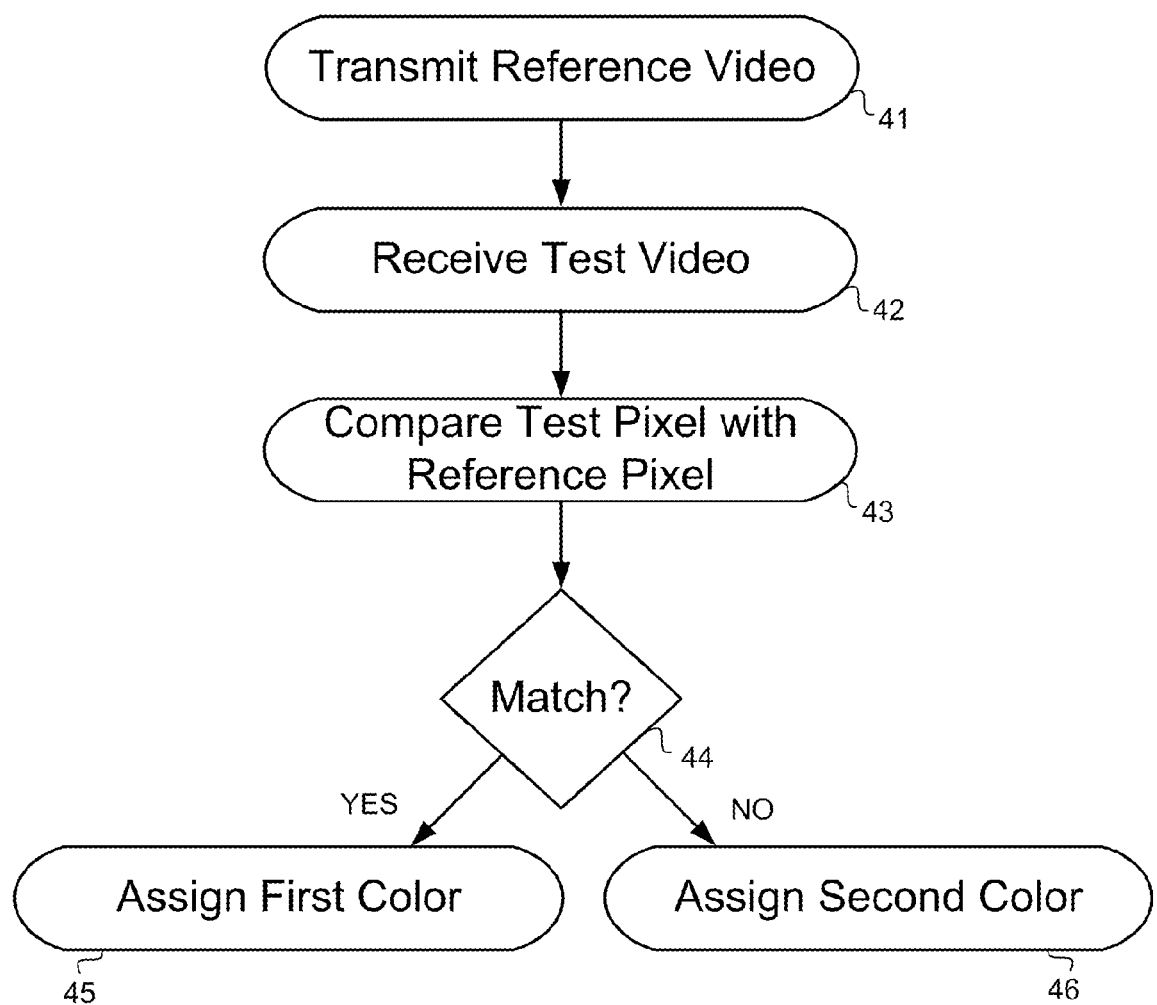

FIG. 4 is an illustrative flowchart for a method of testing a distribution path of a digital video distribution environment, according to an embodiment of the invention.

FIG. 5 is a block diagram illustrating the inventive method for testing a distribution path of a digital video distribution environment, according to an embodiment of the invention.

Figure 6:
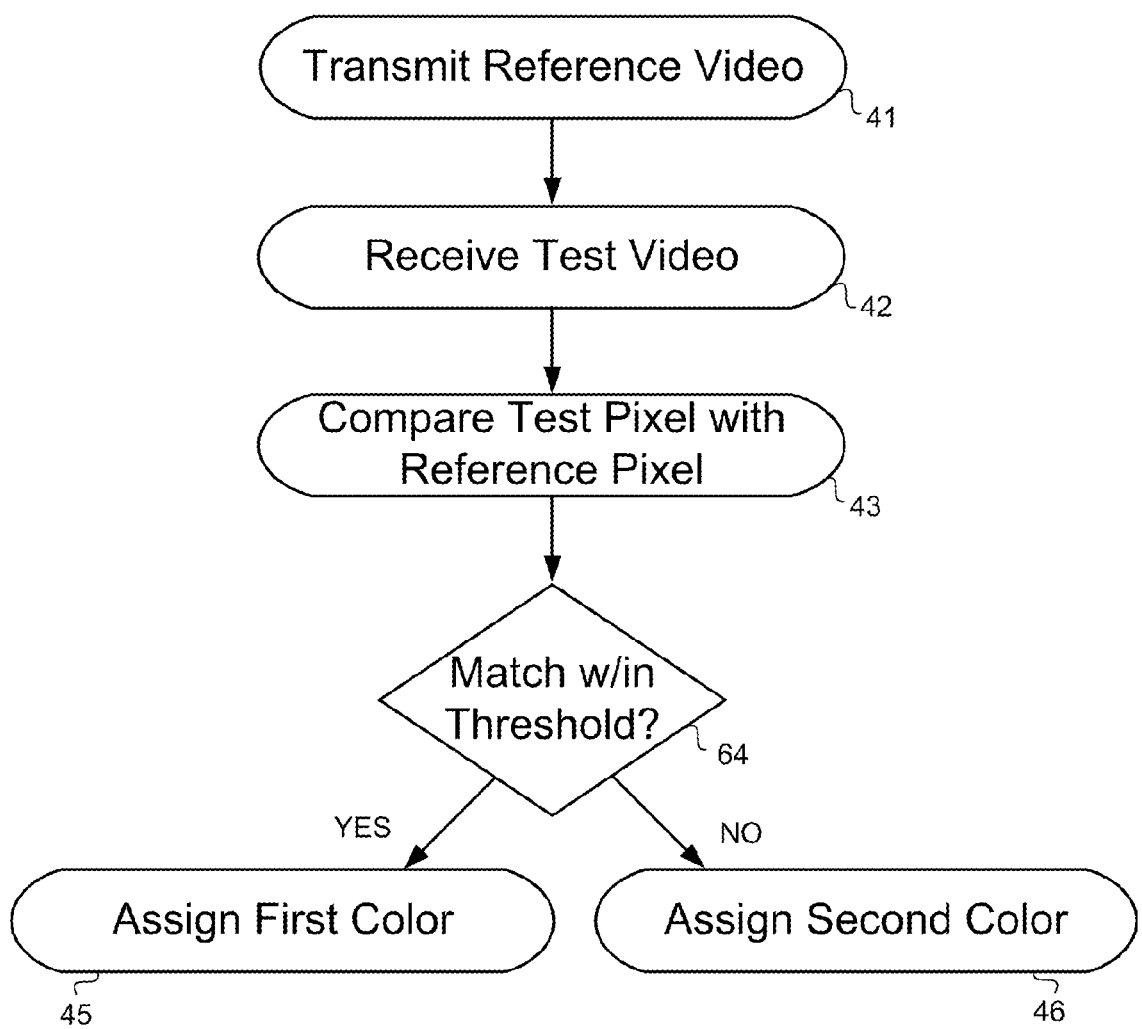

FIG. 6 is an illustrative flowchart for a method of testing a distribution path of a digital video distribution environment, according to an embodiment of the invention.

Figure 7:
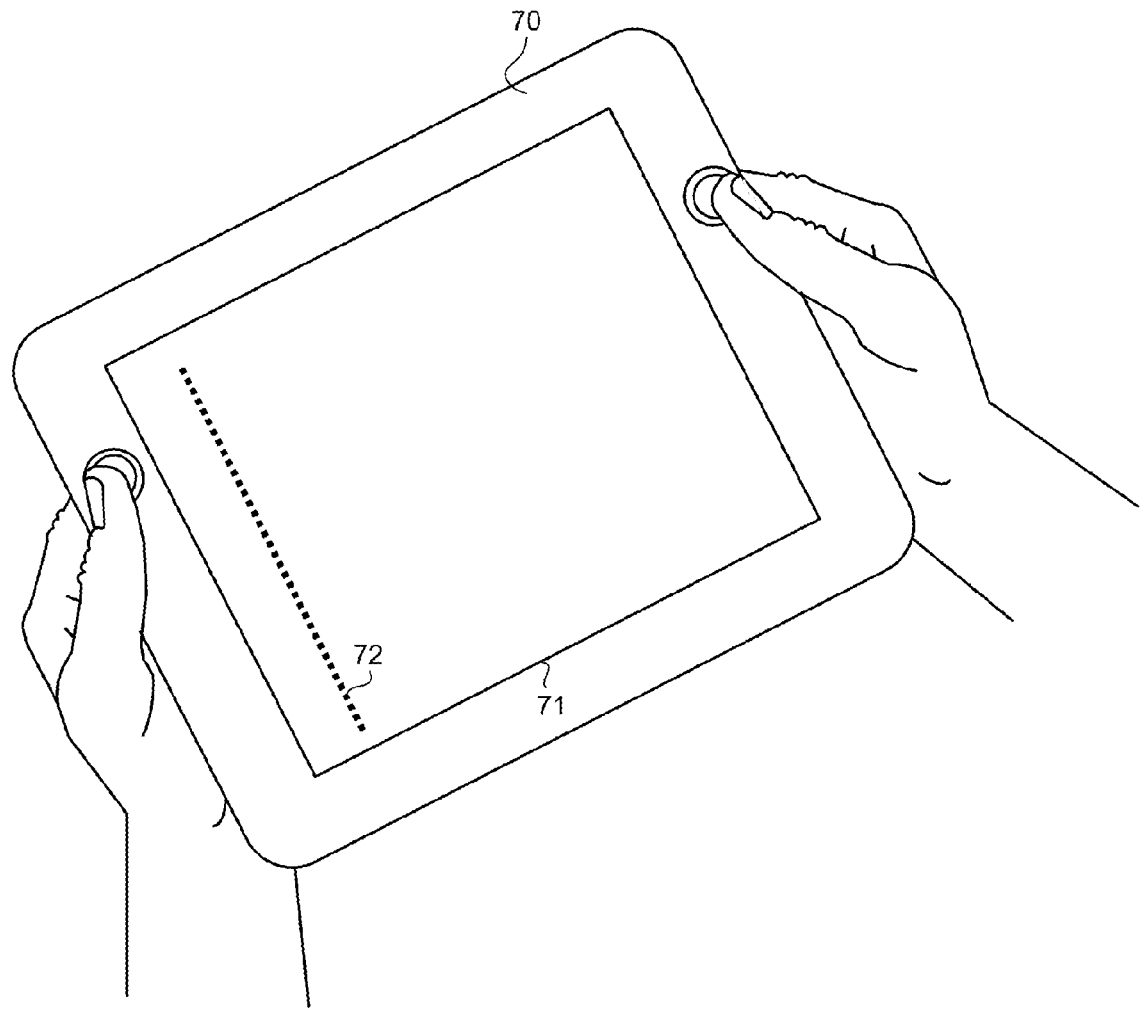

FIG. 7 is a touch screen displaying a diagnostic video bit stream at a native resolution.

Figure 8:
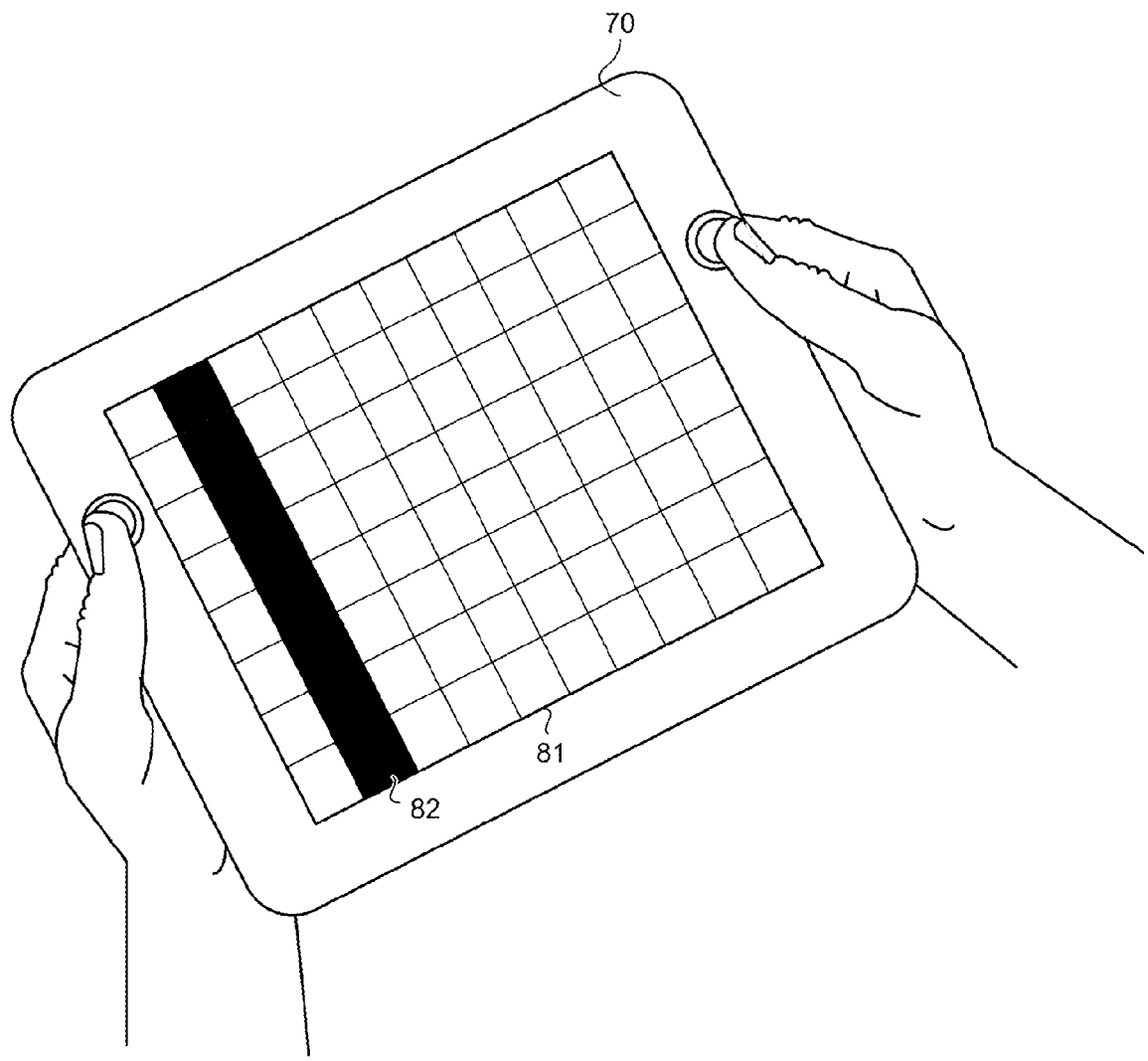

FIG. 8 is a touch screen displaying the diagnostic video bit stream at a first resolution.

Figure 9:
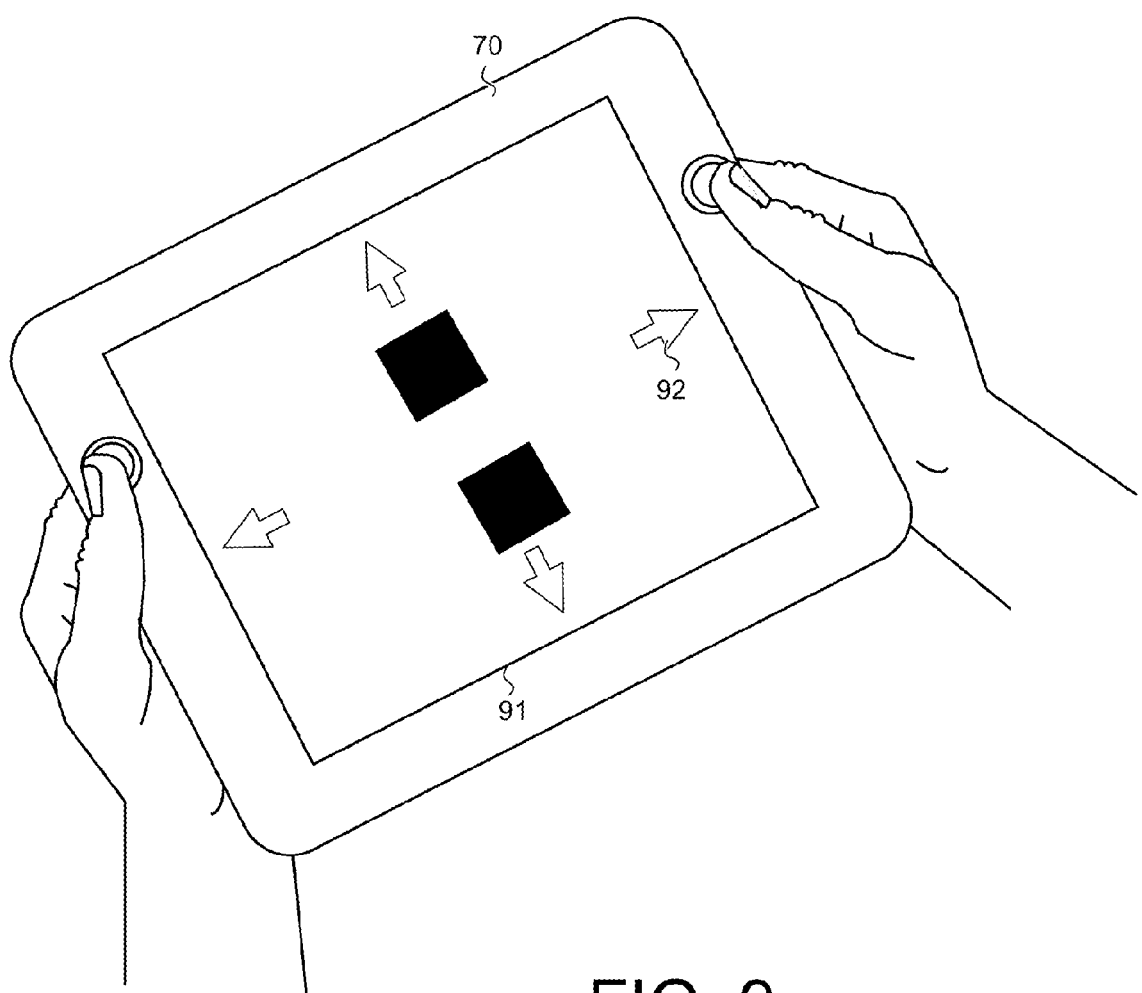

FIG. 9 is a touch screen displaying the diagnostic video bit stream at a second resolution.

LIST OF REFERENCE NUMBERS FOR THE MAJOR ELEMENTS IN THE DRAWING

The following is a list of the major elements in the drawings in numerical order.

10 digital video distribution environment
11A-D digital video source(s)
12 first processing component
13 second processing component
15A-H digital video sink(s)
16 distribution path
21 video bit stream before processing
22 video bit stream after processing
23 differential video bit stream
31 digital video signal generator
32 digital video signal analyzer
33 video display
41 (step of) transmitting a reference video bit stream
42 (step of) receiving a test video bit stream
43 (step of) comparing test pixel with reference pixel
44 (condition of) reference pixel matching test pixel
45 (step of) assigning a first color
46 (step of) assigning a second color
64 (condition of) reference pixel matching test pixel within threshold pixel
70 touch screen
71 diagnostic video bit stream at a native resolution
72 pixel error at native resolution
81 diagnostic video bit stream at a first resolution
82 pixel error
91 diagnostic video bit stream at a second resolution
92 navigational arrow
211 pixel before processing
221 pixel after processing
231 differential pixel
311 reference video bit stream
312 reference information
313 test video bit stream
314 threshold pixel
315 diagnostic video bit stream
511 first reference pixel
512 second reference pixel
513 first test pixel
514 second test pixel
515 first diagnostic pixel
516 second diagnostic pixel

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of the disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Mode(s) for Carrying out the Invention

The present invention involves systems and methods for testing a distribution path of a digital video distribution environment 10, such as the one shown in Prior art FIG. 1. More specifically, the present invention provides a system and method for detecting and emphasizing the presence and location of individual pixel errors.

FIG. 3 is an illustrative block diagram of a system for testing a distribution path of a digital video distribution environment, such as the distribution path 16 shown in prior art FIG. 1. The system comprises a digital video signal generator 31 and a digital video signal analyzer 32. In a preferred embodiment of the invention, the digital video signal generator 31 and the digital video signal analyzer 32 are each implemented as field programmable gate arrays (FPGA). In a further embodiment of the invention the digital video signal generator 31 and the digital video signal analyzer 32 are contained in the same housing. In yet a further embodiment of the invention, the system further comprises a video display 33. Advantageously, the video display 33 can be one the digital video sinks 15A-H of the digital video distribution environment 10 or a touch screen.

Refer to FIG. 4, which shows a flowchart for a method of testing a distribution path 16 of a digital video distribution environment 10. The digital video signal generator 31 transmits a reference video bit stream 311 at a native resolution, such as 1080p, to the distribution path 16 (step 41).

The reference video bit stream 311 further comprises N reference pixels where each of the N reference pixels further comprises color coordinates which define the pixel color. Those skilled in the art will recognize that N may be any whole number greater than zero. For example, a bit stream of ten (10) seconds of reference video at a native resolution of 1080p comprises 1,244,160,000 reference pixels.

In addition to transmitting the reference video bit stream 311 to the distribution path 16, the digital video signal generator 31 also transmits reference information 312 to the digital video signal analyzer 32. The reference information 312 comprises synchronization information, clock information, and identification information for the reference video bit stream 311.

The digital video signal analyzer 32 receives a test video bit stream 313 from the distribution path 16 (step 42). The test video bit stream 313 which results from the reference video bit stream 311 passing through the distribution path 16 includes all processing errors and the like. Just as with the reference video bit stream 311, the test video bit stream 313 is at the native resolution and comprises N test pixels. Each of the N test pixels corresponds to one of the N reference pixels and further comprises color coordinates, which define the pixel color.

The digital video signal analyzer 32 locally generates the reference video bit stream 311 based on the reference information 312 received from the digital video signal generator 31. Using the reference video bit stream 311, the digital video signal analyzer 32 generates a diagnostic video bit stream 315 as a function of the N test pixels and the N reference pixels. The diagnostic video bit stream 315 is at the native resolution and comprises N diagnostic pixels. Each of the N diagnostic pixels corresponds to one of the N reference pixels and one of the N test pixels and further comprises color coordinates.

The digital video signal analyzer 32 generates the diagnostic video bit stream 315 by comparing each test pixel with its corresponding reference pixel (step 43) and assigning either a first color (step 45), such as full black, or a second color (step 46), such as full red, to each of the N diagnostic pixels. The digital video signal analyzer 32 assigns color coordinates defining a first color to each diagnostic pixel whose corresponding reference pixel and corresponding test pixel match (condition 44). The digital video signal analyzer 32 assigns color coordinates defining a second color to each diagnostic pixel whose corresponding reference pixel and corresponding test pixel do not match. A test pixel and a reference pixel match if they have the same color coordinates.

Refer to FIG. 5. As an example of the above method assume the digital signal generator 31 transmits a reference video bit stream 311 in the RGB color coordinate system including a first reference pixel 511 and a second reference pixel 512 each having a red color coordinate of two hundred forty (240), a green color coordinate of one hundred (100), and a blue color coordinate of two hundred (200). Also assume that the digital video signal analyzer 32 receives a first test pixel 513 corresponding to the first reference pixel 511 having a red color coordinate of two hundred forty (240), a green color coordinate of one hundred (100) and a blue color coordinate of two hundred (200). Finally, assume that the digital video signal analyzer 32 receives a second test pixel 514 corresponding to the second reference pixel 512 having a red color coordinate of two hundred (200), a green color coordinate of one hundred fifty (150) and a blue color coordinate of two hundred (200).

The first reference pixel 511 and the first test pixel 513 have the same color coordinates and therefore match. Accordingly, the digital video signal analyzer 32 assigns a first diagnostic pixel 515 the first color, such as full black (i.e. red color coordinate, green color coordinate and blue color coordinate of zero). Accordingly, the second reference pixel 512 and the second test pixel 514 do not have the same color coordinates and therefore do not match. The digital video signal analyzer 32 assigns a second diagnostic pixel 516 the second color, such as full red (i.e. red color coordinate of 255, green color coordinate and blue color coordinate of zero).

Advantageously, pixel errors are displayed in a contrasting color from pixels without error regardless of the magnitude of the pixel error. This allows for minor pixel errors to be displayed in a noticeable manner. In one embodiment of the invention, the first color and second color have default values of full black and full red, respectively. In another embodiment, the first color and the second color are selected according to individual technicians' preferences. For example, when testing a distribution path 16 that includes lossy processes, the first color and the second color may be selected to emphasize the location of pixels without pixel error.

In an embodiment of the invention the digital video signal analyzer 32 compares the N test pixels with the N reference pixels in light of a threshold pixel 314. The threshold pixel 314 comprises color coordinates and is a quantitative measure of tolerance for pixel error. The threshold pixel 314 may be dependent on a host of factors such as tolerance of individual users or characteristics of the distribution path 16.

In an embodiment of the invention, the digital video signal analyzer 32 receives the color coordinates of the threshold pixel 314 from the technician. In another embodiment, the digital video signal analyzer 32 retrieves the color coordinates of the threshold pixel 314 from a local memory. For example, the color coordinates 314 of the threshold pixel 314 may be stored in the local memory as a factory default or after prior use.

Refer to FIG. 6. In embodiments of the invention, the digital video signal analyzer 32 assigns the first color (step 45) to each diagnostic pixel whose corresponding reference pixel and corresponding test pixel match within the threshold pixel 314 (condition 64). The digital video signal analyzer 32 assigns the second color (step 46) to each diagnostic pixel whose corresponding reference pixel and corresponding test pixel do not match within the threshold pixel 314.

A test pixel and a reference pixel match within the threshold pixel 314 if the absolute differences between their color coordinates are less than or equal to the color coordinates of the threshold pixel 314. Test pixels and reference pixels do not match within the threshold pixel 314 if one or more of the absolute differences between their color coordinates are greater than the color coordinates of the threshold pixel 314.

Those skilled in the art will recognize that in other embodiments, a test pixel and a reference pixel do not match within the threshold pixel 314 if one or more of the absolute differences between their color coordinates is equal to the threshold pixel 314.

Continuing with the example from FIG. 5, assume the digital video signal analyzer 32 compares the second test pixel 514 and second reference pixel 512 in light of a threshold pixel 314 having a red color coordinate of seventy (70), a green color coordinate of fifty-five (55) and a blue color coordinate of seventy (70). The absolute difference between the red color coordinate of the first reference pixel 511 and the red color coordinate of the first test pixel 513 is forty (40) which is less than the red color coordinate of the threshold pixel 314. The absolute difference between the green color coordinate of the first reference pixel 511 and the green color coordinate of the first test pixel 513 is fifty (50) which is less than the green color coordinate of the threshold pixel 314. The absolute difference between the blue color coordinate of the first reference pixel 511 and the blue color coordinate of the first test pixel 513 is fifty (50) which is less than the blue color coordinate of the threshold pixel 314. Although the color coordinates of the second reference pixel 512 and second test pixel 514 do not match, their absolute differences are less than the color coordinates of the threshold pixel 314. Accordingly, the reference pixel and the test pixel match within the threshold pixel 314 and the digital video signal analyzer assigns the second diagnostic pixel 516 the first color.

To further emphasize the location of pixel errors, embodiments of the invention further comprise a video display 33 configured for displaying the diagnostic video bit stream 315 at a plurality of resolutions. A technician may select a resolution from the plurality of resolutions and the video display 33 displays the diagnostic video bit stream 315 at the selected resolution. Advantageously, this allows the technician to locate single pixel errors or small clusters of pixel errors that may not be distinguishable with the human eye.

FIG. 7 shows a touch screen 70 displaying the diagnostic video bit stream 315 at the native resolution 71, according to one embodiment of the invention. In this embodiment, pixels without pixel error are displayed on the touch screen 70 as full white and pixel errors 72 are displayed on the touch screen 70 as full black.

FIG. 8 shows a touch screen 70 displaying the diagnostic video bit stream 315 at a first resolution 81. The diagnostic video bit stream 315 is downscaled to resolutions lower than the native resolution, such as the first resolution, by converting contiguous groups of pixels at the native resolution into a single pixel at the lower resolution. Each pixel 82 at the first resolution converted from a group of pixels at the native resolution comprising no pixel errors is assigned the first color by the digital video signal analyzer. Each pixel 83 at the first resolution converted from a group of pixels at the native resolution comprising one or more pixel errors is assigned the second color by the digital video signal analyzer.

FIG. 9 shows the touch screen 70 displaying the diagnostic video bit stream 315 at a second resolution 91. The diagnostic video bit stream 315 is upscaled to resolutions higher than the native resolution, such as the second resolution, by centering the diagnostic video bit stream 315 to a portion with the same aspect ratio of the native resolution and interpolating to the native resolution. The upscaled portion is displayed on the video display 33 as a scrollable portion of the diagnostic video. The technician can center to a new portion, such as by selecting a navigational arrow 92.

In an embodiment of the invention, the technician may select from a plurality of resolutions progressively lower and progressively higher than the native resolution. Advantageously, this allows the technician to initially view the diagnostic video bit stream 315 broadly from a low resolution to detect the existence of pixel errors and make a quick diagnosis. The technician may then progressively refine the resolution as needed to make more detailed observations.

Industrial Applicability

To solve the aforementioned problems, the present invention is a unique system in which a distribution path 16 of a digital video distribution environment is tested and a diagnostic video bit stream 315 is generated.

List Of Acronyms Used In The Detailed Description Of The Invention

The following is a list of the acronyms used in the specification in alphabetical order.

FPGA field programmable gate array
FPS frames per second
PRN pseudo-random noise
RGB red green blue Alternate Embodiments Alternate embodiments may be devised without departing from the spirit or the scope of the invention. For example, the digital video signal analyzer 32 may receive the threshold pixel 314 from the digital video signal generator 31.

What is claimed is:

1. A method for testing a distribution path of a digital video distribution environment, said method comprising the steps of:
   (a) transmitting a reference video bit stream from a digital video signal generator to the distribution path, said reference video bit stream comprising N reference pixels;
   (b) receiving a test video bit stream from the distribution path at a digital video signal analyzer, said test video bit stream comprising N test pixels;
   (c) generating a diagnostic video bit stream comprising N diagnostic pixels, each of said N diagnostic pixels corresponding to one of said N reference pixels and one of said N test pixels, by
      (i) assigning a first color to each diagnostic pixel of said N diagnostic pixels whose corresponding one of said N reference pixels and corresponding one of said N test pixels match, said first color being common for each matching pixel, and
      (ii) assigning a second color to each diagnostic pixel of said N diagnostic pixels whose corresponding one of said N reference pixels and corresponding one of said N test pixels do not match, said second color being common for each non-matching pixel;
   (d) selecting a first resolution different from an originally presented resolution for a diagnostic purpose, wherein the diagnostic purpose is to either focus on a specific area of the diagnostic video and the first resolution is greater than the originally presented resolution or the diagnostic purpose is to view large trends of the diagnostic video and the first resolution is less than the originally presented resolution; and
   (e) displaying the diagnostic video bit stream at the first resolution.

2. The method of claim 1 wherein the diagnostic video bit stream is generated by:
   (a) assigning the first color to each diagnostic pixel of said N diagnostic pixels whose corresponding one of said N reference pixels and corresponding one of said N test pixels match within a threshold pixel; and
   (b) assigning the second color to each diagnostic pixel of said N diagnostic pixels whose corresponding one of said N reference pixels and corresponding one of said N test pixels do not match within the threshold pixel.

3. The method of claim 2 wherein the threshold pixel is user defined.

4. The method of claim 2 wherein the threshold pixel is dependent on characteristics of the distribution path.

5. The method of claim 1 wherein the first color and the second color are defined by the user.

6. A system for testing a distribution path of a digital video distribution environment, said system comprising:
 (a) a digital video signal generator for transmitting a reference video bit stream to the distribution path, said reference video bit stream comprising N reference pixels; and
 (b) a digital video signal analyzer for
  (i) receiving a test video bit stream from the distribution path, said test video bit stream comprising N test pixels,
  (ii) generating a diagnostic video bit stream at an originally presented resolution comprising N diagnostic pixels, each of said N diagnostic pixels corresponding to one of said N reference pixels and one of said N test pixels, by assigning a first color to each diagnostic pixel of said N diagnostic pixels whose corresponding one of said N reference pixels and corresponding one of said N test pixels match and assigning a second color to each diagnostic pixel of said N diagnostic pixels whose corresponding one of said N reference pixels and corresponding one of said N test pixels do not match, wherein the first color is common for each matching pixel and the second color is common for each non-matching pixel, and
  (iii) converting the diagnostic video bit stream from the originally presented resolution to a first resolution for a diagnostic purpose wherein the diagnostic purpose is to either focus on a specific area of the diagnostic video and the first resolution is greater than the originally presented resolution or the diagnostic purpose is to view large trends in the diagnostic video and the first resolution is less than the originally presented resolution.

7. The system of claim 6 wherein the digital video signal analyzer generates the diagnostic video bit stream by:
 (a) assigning the first color to each diagnostic pixel of said N diagnostic pixels whose corresponding one of said N reference pixels and corresponding one of said N test pixels match within a threshold pixel; and
 (b) assigning the second color to each diagnostic pixel of said N diagnostic pixels whose corresponding one of said N reference pixels and corresponding one of said N test pixels do not match within the threshold pixel.

8. The system of claim 7 wherein the threshold pixel is user defined.

9. The system of claim 7 wherein the threshold pixel is dependent on characteristics of the distribution path.

10. The system of claim 6 further comprising a video display for displaying the diagnostic video bit stream at a plurality of resolutions.

11. The system of claim 6 wherein the digital video signal generator and the digital video signal analyzer are contained in the same housing.

12. The system of claim 6 wherein the first color and the second color are defined by the user.

13. The method of claim 1 wherein the first resolution is greater than the originally presented resolution and the diagnostic video is displayed at the first resolution as a scrollable portion of the diagnostic video.

14. The method of claim 1 wherein the first resolution is less than the originally presented resolution and the diagnostic video is displayed at the first resolution by converting contiguous groups of pixels at the native resolution into a single pixel at the lower resolution and wherein contiguous groups of pixels not comprising a non-matching pixel are assigned the first color and contiguous groups of pixels comprising a non-matching pixel are assigned the second color.

15. The method of claim 1 further comprising the steps of
 (a) displaying the first resolution; and
 (b) displaying a series of one or more resolutions, each of the one or more resolutions being progressively greater than the first resolution.

16. The method of claim 1 further comprising the steps of
 (a) displaying the first resolution; and
 (b) displaying a series of one or more resolutions, each of the one or more resolutions being progressively lower than the first resolution.

* * * * *